Sept. 27, 1938.  R. HAFNER  2,131,348
ROTATING WING AIRCRAFT
Filed July 27, 1935
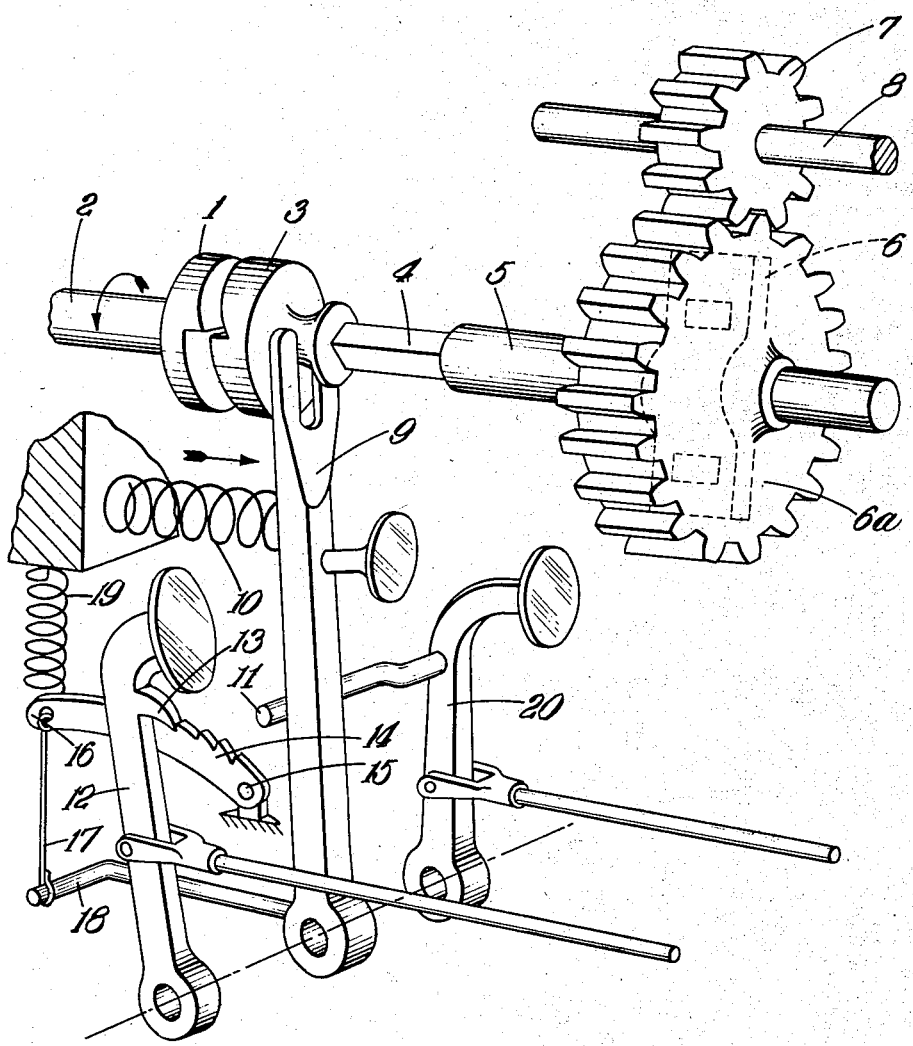
Raoul Hafner
INVENTOR
his ATTY.

Patented Sept. 27, 1938

2,131,348

UNITED STATES PATENT OFFICE 2,131,348

ROTATING WING AIRCRAFT

Raoul Hafner, Vienna, Austria

Application July 27, 1935, Serial No. 33,462
In Great Britain November 9, 1934

4 Claims. (Cl. 244—60)

This invention relates to aircraft of the kind having a rotating wing system, hereinafter called a rotor, in which the said rotor is positively driven by the engine or in which a drive from the engine is used to give the rotor its initial revolutions before taking off, and has for its principal object the provision therein of means for automatically preventing over-acceleration and consequent overloading of the parts thereof during starting.

According to the present invention such aircraft incorporate, in the transmission means or drive from the engine to the rotor, a coupling or clutch device which transmits torque to the rotor at a ratio increasing in correspondence to the increasing speed of the driven member thereof and the rotor and becomes rigid, when the rotation of the rotor exceeds a predetermined value.

Among the various forms of couplings or clutch devices fulfilling the above requirement may be mentioned the centrifugal type and particularly the devices using powdered material or shot.

In operation this apparatus automatically ensures that at low speeds of the rotor, when the centrifugal force is insufficient to maintain the blades in approximately radial disposition against other influences, the maximum torque applied to the hub shall not be sufficient to cause strain or damage in the blade roots or their mountings, whereas as the rotor picks up speed the slip in the system is diminished and the torque transmitted is suitably increased.

This desirable effect is not, of course, achieved by using overload-relief couplings adapted to slip at predetermined fixed values of torque, independently of the speed of the system. In such cases the pilot has to exercise considerable caution in engaging the main clutch to avoid overload at low speeds, whereas in the present case this is not called for. In fact the main clutch in aircraft according to the invention may obviously be of a simple and light positively-engaging kind, such as a dog clutch, without incurring any risk of over-acceleration of the rotor when starting.

The invention is described with reference to the accompanying drawing, wherein the only figure shows diagrammatically the clutch and the control levers in isometric projection.

The axially fixed portion 1 of a dog clutch is mounted upon a driving shaft 2 and the other portion 3 of the said clutch is slidably mounted on a squared portion 4 of the driven shaft 5. This shaft 5 is connected to one portion 6 of a shot or powder clutch the outer case 6a of which is provided with a gear ring which engages a spur wheel 7 on a shaft 8 gearing with the rotor. While the drawing shows the paddle connected to the driving shaft and the case in engagement with the driven shaft, it is obvious that the desired effect could also be obtained if the paddle would be connected with the driven shaft and the case with the driving shaft. The movable portion 3 of the dog clutch is controlled by a pedal lever 9 and a spring 10 is provided to keep the said pedal normally in the raised position with the two parts 1, 3 disengaged.

On the right hand side of the pedal lever 9 is mounted a pedal lever 20 which controls the wheel brakes. The said lever is provided with a projection 11 extending behind the back of the lever 9 so that the lever 9 cannot be depressed without applying the wheel brakes. The wheel brakes, however, may be applied without putting in the clutch.

To the left of the pedal lever 9 is mounted a pedal lever 12 which is connected to the rotor brake. This lever 12 has a fixed pawl 13 adapted to engage teeth in a ratchet quadrant 14 which is pivoted at one end 15 to a fixed portion of the body of the machine and is connected at its other end 16 to a link 17 which is pivoted at its lower end to a projection 18 from the lever 9.

The quadrant is normally held in engagement with the pawl by a spring 19 connected to a fixed portion of the body of the machine.

With this mechanism when the clutch lever 9 is depressed to engage the clutch 1, 3 the lever 9 engages the projection 11 and applies the wheel brakes. At the same time the projection 18 on the lever 9 by means of the link 17 pulls down the back end 16 of the quadrant 14 against the action of the spring 19 and releases the quadrant 14 and pawl 13 thereby releasing the pedal lever 12 and the rotor brake.

Thus the clutch cannot be thrown in while the rotor brake is on or while the wheel brakes are off.

When the clutch 1, 3 is engaged the two portions of the fluid flywheel 6, 6a move relatively to one another transmitting a limited torque until the rotor has been speeded up.

If desired, instead of the clutch lever 9 being at all times urged outwardly by the spring 10, it may have associated therewith an over-centre or spring toggle mechanism so that it will remain in the depressed position until positively dislodged therefrom, thereby relieving the pilot of the necessity of holding it down during the speeding up of the rotor. With such an arrangement it would be of advantage to have the lever 9 in the form of a rockable treadle to facilitate its positive movement by the foot in either direction.

What I claim and desire to secure by Letters Patent of the United States is:—

1. In a rotative wing aircraft means for transmitting power from the engine to the rotor including a coupling device having a driving member, a driven member, and centrifugal clutch means arranged on the driven member to increase the degree of engagement between the driven member and the driving member in dependence upon the increase in the angular velocity of the driven member, whereby at any given speed of the driven member the coupling slips when the torque to be transmitted exceeds a maximum predetermined value relative to said speed.

2. A device, as claimed in claim 1, in which said coupling device is a centrifugal clutch having a pulverulent torque transmission medium.

3. Means for transmitting power from the prime mover to the supporting rotor of a rotary wing aircraft to accelerate said rotor from rest, comprising a clutch device having driving and driven members and centrifugal means responsive to increase in speed of said driven member, substantially irrespective of the speed of said driving member, for increasing the degree of engagement of said members and consequently to increase the maximum torque transmissible to said rotor by said clutch device.

4. Means for transmitting power from the prime mover to the supporting rotor of a rotary wing aircraft to accelerate said rotor from rest, comprising a clutch device having driving and driven members and centrifugal means to regulate the degree of engagement of said clutch device and consequently the maximum torque transmissible thereby to said rotor, said centrifugal means being carried round by said driven member so as to proportion said maximum transmissible torque to the speed of the rotor rather than to that of the prime mover.

RAOUL HAFNER.